J. F. EAST.
BASKET.
APPLICATION FILED DEC. 15, 1916.

1,257,823.

Patented Feb. 26, 1918.
2 SHEETS—SHEET 1.

Inventor
John F. East

By Mason Fenwick & Lawrence,
Attorneys

J. F. EAST.
BASKET.
APPLICATION FILED DEC. 15, 1916.
1,257,823.
Patented Feb. 26, 1918.
2 SHEETS—SHEET 2.
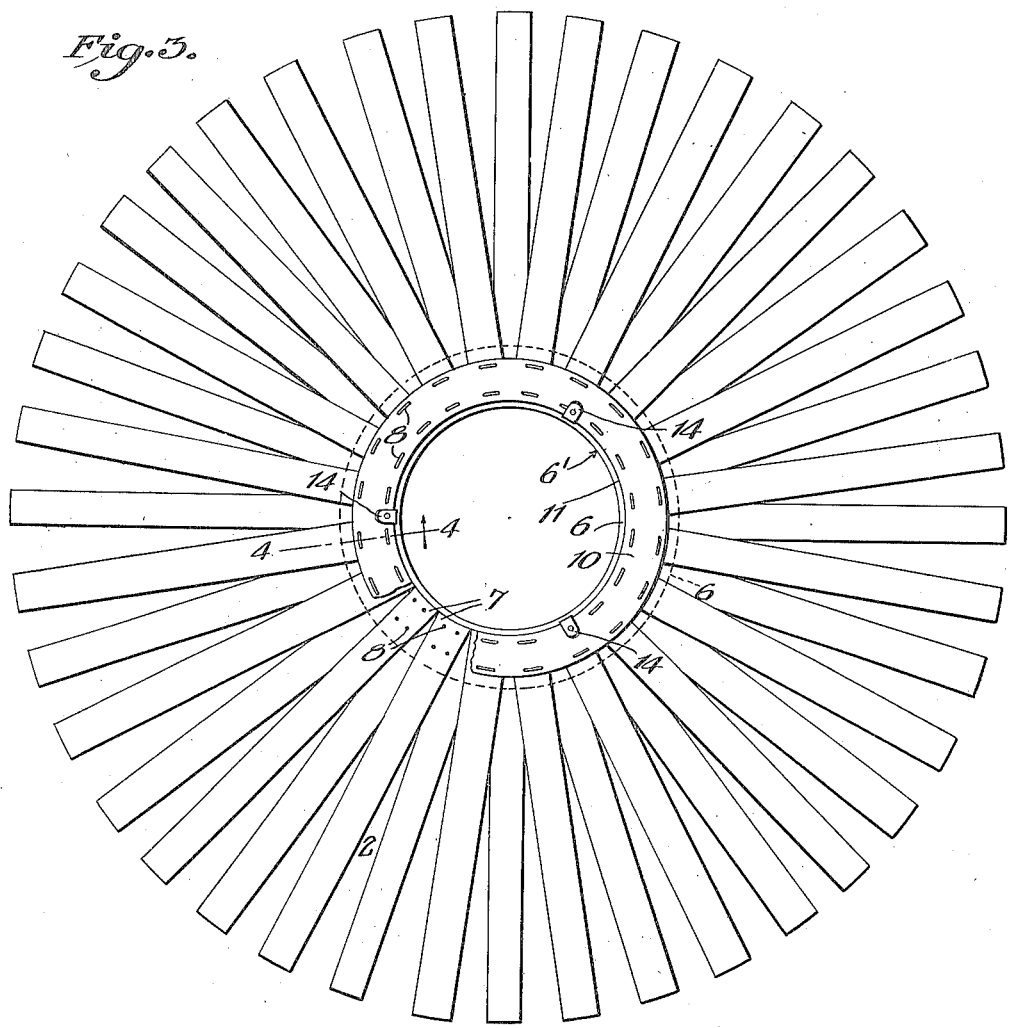
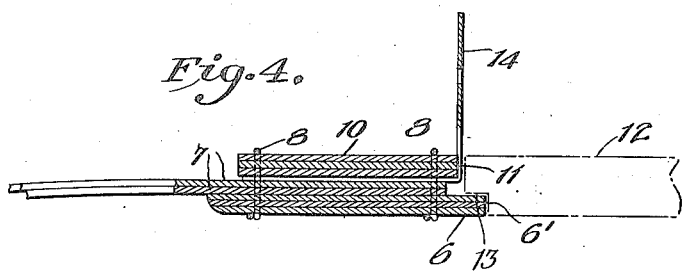
Inventor
John F. East
By Mason Fenwick & Lawrence,
Attorneys

UNITED STATES PATENT OFFICE.

JOHN F. EAST, OF NORFOLK, VIRGINIA.

BASKET.

1,257,823.  Specification of Letters Patent.  Patented Feb. 26, 1918.

Application filed December 15, 1916. Serial No. 137,207.

*To all whom it may concern:*

Be it known that I, JOHN F. EAST, a citizen of the United States, residing at Norfolk, in the county of Norfolk and State of Virginia, have invented certain new and useful Improvements in Baskets; and I do hereby declare the following to be a full, clear, and exact description of the invention, such as will enable others skilled in the art to which it appertains to make and ues the same.

This invention relates to receptacles, and more particularly to baskets.

It is an object of the present invention to improve the construction of baskets to facilitate the filling of the basket when it is in an inverted position with its cover or top applied, the basket being provided with an opening in its bottom to permit the filling or charging of the basket by the material such as fruit, vegetables, etc., to be shipped or contained in the receptacle.

It is a further object of the invention to provide an improved structure of baskets of the type involving walls of staves or splints, the basket having an open top and bottom, and providing a bottom or closure readily applicable to the basket structure after the latter has been filled while in an inverted position, and to provide for the ready and efficient securing of the bottom closure in position when applied.

It is a further object of the invention to provide an improved basket construction and a method for building the improved basket.

With these and other objects in view, as will be manifest to those skilled in the art, my invention consists in a basket and in the method of manufacturing the same, as more particularly set forth in the following specification and as embodied in the forms illustrated in the accompanying drawings, in which:

Fig. 3 is a plan view of the basket structure in one step of its manufacture.

Fig. 4 is an enlarged detail sectional view on line 4—4 of Fig. 3 through the bottom structure of the basket to show the laminated inner and outer annuli embracing the splints of the basket wall or shell.

In the filling of receptacles, such, for instance, as containers for vegetables, fruits, ets., for the market or for storage or display, it is desirable that the material, for instance, fruit, be arranged in the most practicable and economical manner, and to obtain the best effect in the display of the goods in the container, and it is further advantageous that the packing of the fruit or vegetables be facilitated, and my present invention contemplates the provision of a container such, for instance, as a basket of suitable shape or form and the desired size which has the usual top opening, and which is adapted to be covered by any appropriate form of top or cover, the basket also being provided with an open bottom. This enables the packer to apply the top or cover to the open top of the basket and secure it in place, and then invert the basket and proceed to fill the latter with its contents, arranging the articles, or pieces, or fruit in a layer on the bottom upon the inside of the inverted top or cover, and then proceed to pile up the contents by insertion through the open bottom portion of the basket.

Figure 1:
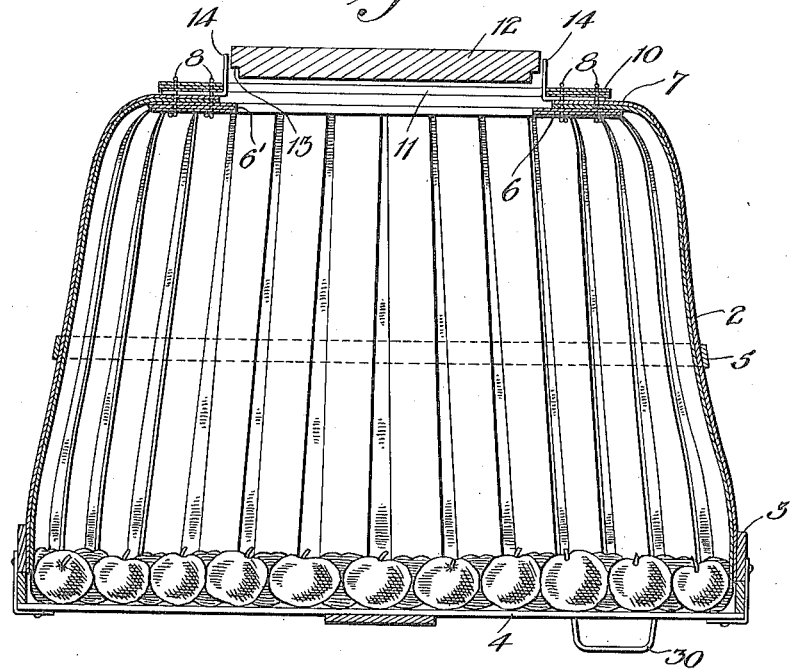
Figure 1 is a vertical section through a basket in one embodiment of the invention.
Figure 2:
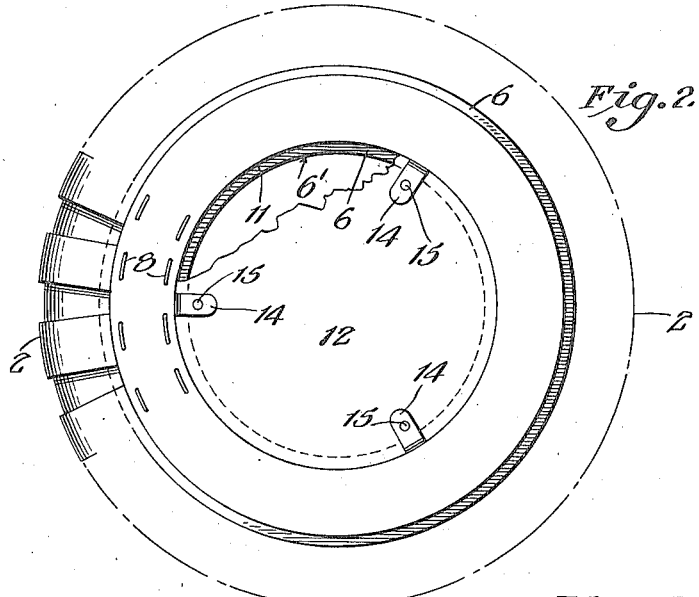
Fig. 2 is a plan view of a portion of the bottom structure of the basket, showing the bottom closure applied and secured in position.

In accomplishing these objects I have shown in Fig. 1 a basket of suitable shape composed of a splint wall 2, the top ends of which may be girdled by a bond or band 3 to secure it in the desired form, and upon this may be fitted any appropriate cover 4. The intermediate portion or waist of the basket may be reinforced by a hoop 5, and the bottom of the basket is formed by bringing the individual splints 2 inwardly together and securing them preferably upon a flat annulus or ring structure. In the embodiment shown in Fig. 1 the ring structure consists of an inner flat annulus 6 of suitable diameter over which the ends 7 of the splints forming the wall 2 are inwardly curved to be secured therein, and, as shown in Fig. 3, the inner ends of the splints 2 overlap upon each other and are stitched as at 8 or fastened by other suitable means. The aperture 6' within the annulus 6 provides an opening through which the material with which the container is filled may be passed, as before indicated, and stacked upon the inverted cover 4. Preferably the overlapping ends 7 of the splints of the wall of the basket are covered by an outer annulus 10 of suitable diameter, and the stitching or other fastening means 8 is passed through the superposed layers consisting of the inner annulus 6, the overlapping ends 7 of the splints 2, and the outermost or bottom annulus or flat ring 10 thereby affording a very substantial rigid bottom structure, as well also as protecting the ends 7 of the splints from wear and fracture.

The bottom annulus or ring 10 may be and preferably is of slightly less diameter than the inner annulus 6, and its inner edge 11 provides an opening slightly larger than the aperture or opening 6' of the inner annulus 6. This forms a rabbet or annular seat upon which may be applied a closure 12 which may be secured in any desirable manner in position to cover the opening through the bottom of the basket. Obviously, if the outer flat ring 10 is not employed, the closure 12 may be applied to the ring 6 and suitably secured thereon, and may and preferably is provided with a rabbet 13 at one side to fit the inwardly projecting edge of the inner annulus 6.

While, as above stated, the closure 12 may be secured to the bottom structure of the basket in any suitable manner, a simple, practicable, inexpensive and reliable form of closure is shown as including a series of pieces of box binding material 14 which may be secured to the bottom structure of the basket as is illustrated for instance in Figs. 1 to 4 inclusive in which one end of each binding piece 14 passes between the rings 10 and 6 and is secured therewith, while the outer end of each piece projects upwardly from the bottom of the basket and is adapted to be bent over the applied bottom closure 12 after the basket has been filled. The fastening pieces 14 may then be secured to the applied bottom by tacks, nails, or other appropriate means 15.

Thus it will be seen that by my method of constructing the basket the splints 2, Fig. 3, are laid upon the inner annulus 6 in suitable radiating position suitably over-lapping each other at their inner ends, and the outer protecting annulus or bottom ring 10 is then applied and the whole securely fastened together, though, as before stated, the outer bottom ring 10 may be omitted, in which event the ends 7 of the splints 2 are secured directly to the inner ring 6. After the radiating splints have been secured, as indicated in Fig. 3, they are then curved sharply over the inner ring 6 and their upper ends are secured by a support or band, as 3, and may be reinforced centrally by the waist hoop 5.

What I claim is:

1. A splint basket comprising a shell of splints having their inner ends secured in overlapping relation to each other upon and radiating from a flat annulus the aperture of which forms a filling opening, and connected at their upper ends by a band or support.

2. A splint basket comprising a shell of splints having their inner ends secured in overlapping relation to each other upon and radiating from a flat annulus the aperture of which forms a filling opening, and connected at their upper ends by a band or support, and a detached closure applicable to the said ring to close its aperture.

3. An open top and bottom basket comprising a wall of splints, superposed flat annuli between which the bottom ends of the splints are arranged in overlapping radial position and secured, the annuli forming a filling opening for the inverted basket, the splints being bent upwardly, means for securing the top ends thereof in place, and a bottom closure applicable to the rings to close the bottom opening.

4. A basket comprising an inner bottom annulus forming a filling opening, shell or wall splints curved inwardly toward and overlapping said annulus and secured thereto at their ends, and a disk closure adapted to be fastened to said structure to close the aperture of the annulus.

5. A basket comprising an inner bottom annulus the aperture of which forms a filling opening, shell or wall splints curved inwardly toward and overlapping said annulus and secured thereto at their ends, a disk closure adapted to be fastened to said structure to close the aperture of the annulus, and an outer annulus secured over the splint ends on the first or inner annulus.

6. A basket comprising an inner bottom annulus the aperture of which forms a filling opening, shell or wall splints curved inwardly toward and terminating on said annulus, a disk closure adapted to be fastened to said structure to close the aperture of the annulus, and an outer annulus secured over the splint ends on the first or inner annulus, and forming therewith a rabbet for said closure.

In testimony whereof I affix my signature.

JOHN F. EAST.